(No Model.) 3 Sheets—Sheet 1.
H. WEICHERT.
MACHINE FOR CUTTING HOLES IN WOOD OR OTHER MATERIALS.
No. 349,772. Patented Sept. 28, 1886.
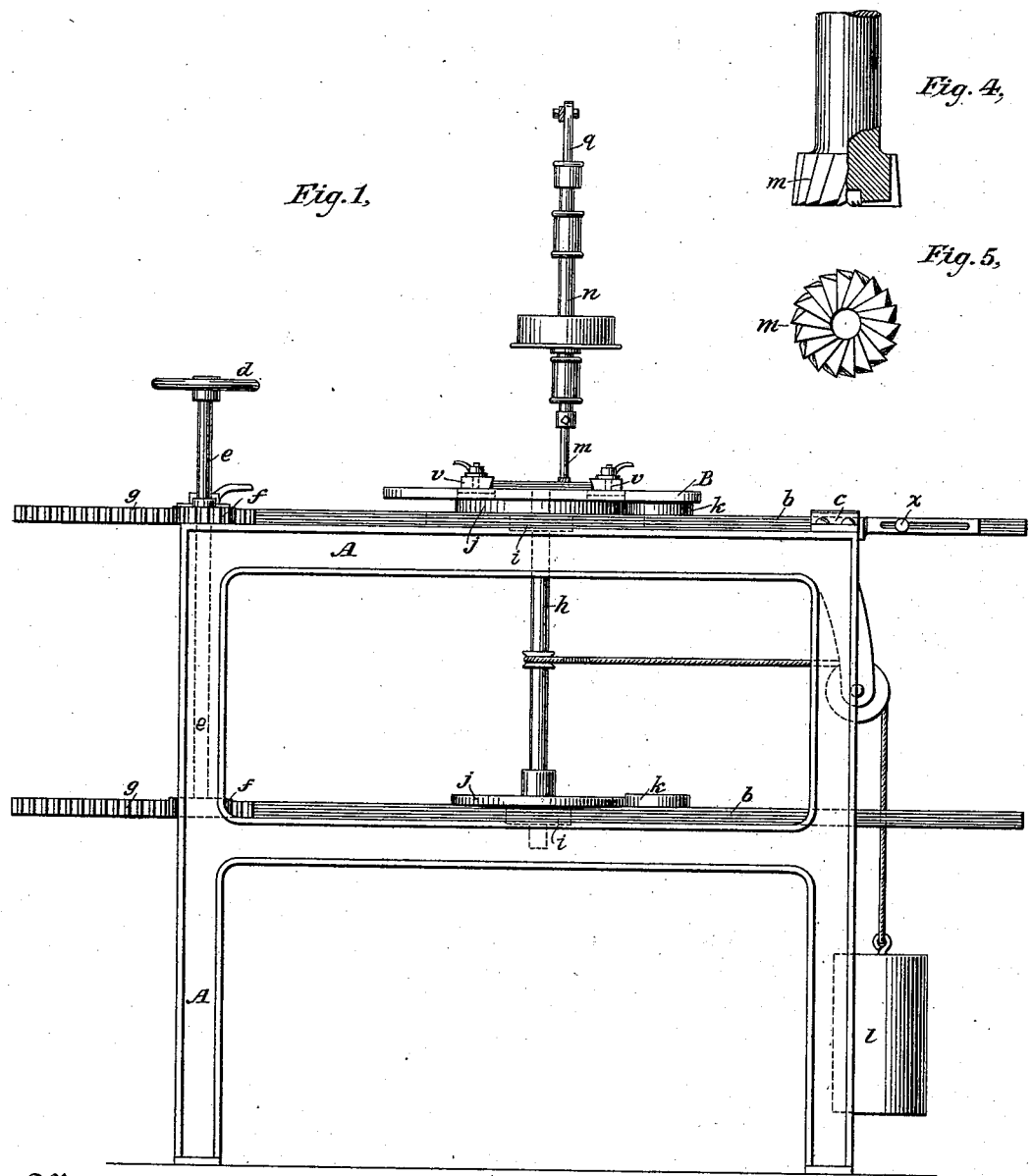

(No Model.) 3 Sheets—Sheet 2.
H. WEICHERT.
MACHINE FOR CUTTING HOLES IN WOOD OR OTHER MATERIALS.
No. 349,772. Patented Sept. 28, 1886.
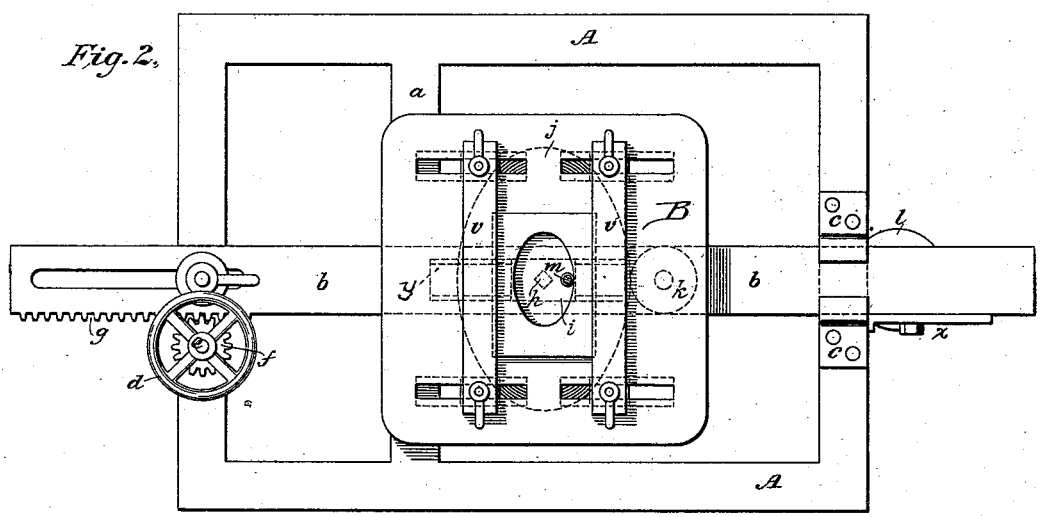
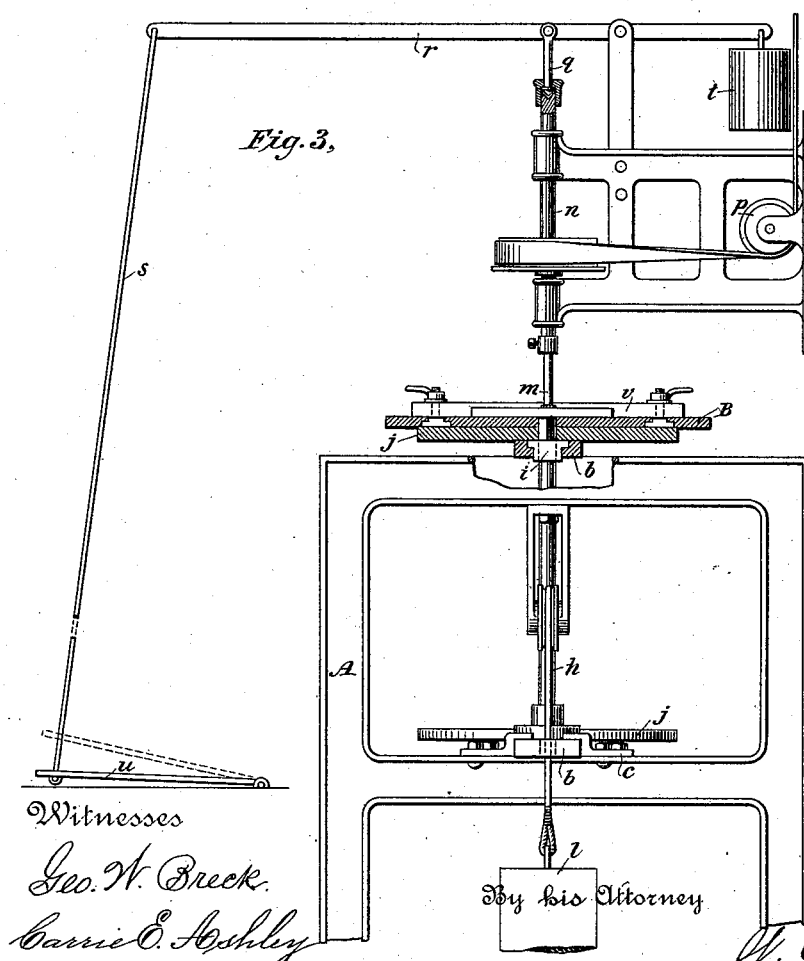

(No Model.) 3 Sheets—Sheet 3.

H. WEICHERT.
MACHINE FOR CUTTING HOLES IN WOOD OR OTHER MATERIALS.

No. 349,772. Patented Sept. 28, 1886.

Witnesses
Geo. W. Breck
Carrie E. Ashley

Inventor
Hermann Weichert
By his Attorney
W. C. Witter

UNITED STATES PATENT OFFICE.

HERRMANN WEICHERT, OF HOBOKEN, NEW JERSEY.

MACHINE FOR CUTTING HOLES IN WOOD OR OTHER MATERIALS.

SPECIFICATION forming part of Letters Patent No. 349,772, dated September 28, 1886.

Application filed May 29, 1886. Serial No. 203,575. (No model.)

*To all whom it may concern:*

Be it known that I, HERRMANN WEICHERT, a citizen of the United States, and a resident of Hoboken, New Jersey, have invented a new and useful Improvement in Machines for Cutting or Sinking Holes in Wood or other Materials; and I hereby declare the following to be a full, clear, and exact description of the same, reference being had to the accompanying drawings, and the letters and figures of reference marked thereon, which form a part of this specification.

My invention relates to machines for sinking holes or recesses of predetermined sizes, shapes, and depth in a piece of wood or other material; and the objects of my invention are, first, to make it possible to produce and reproduce cuttings of any shape or size with accuracy and uniformity by the employment of self-acting patterns or models; second, to enable the different parts of the machine to be easily adjusted so as to produce any size of cutting desired; and, third, by the saving of force, time, and labor, to secure economy in the manufacture.

Figure 6:
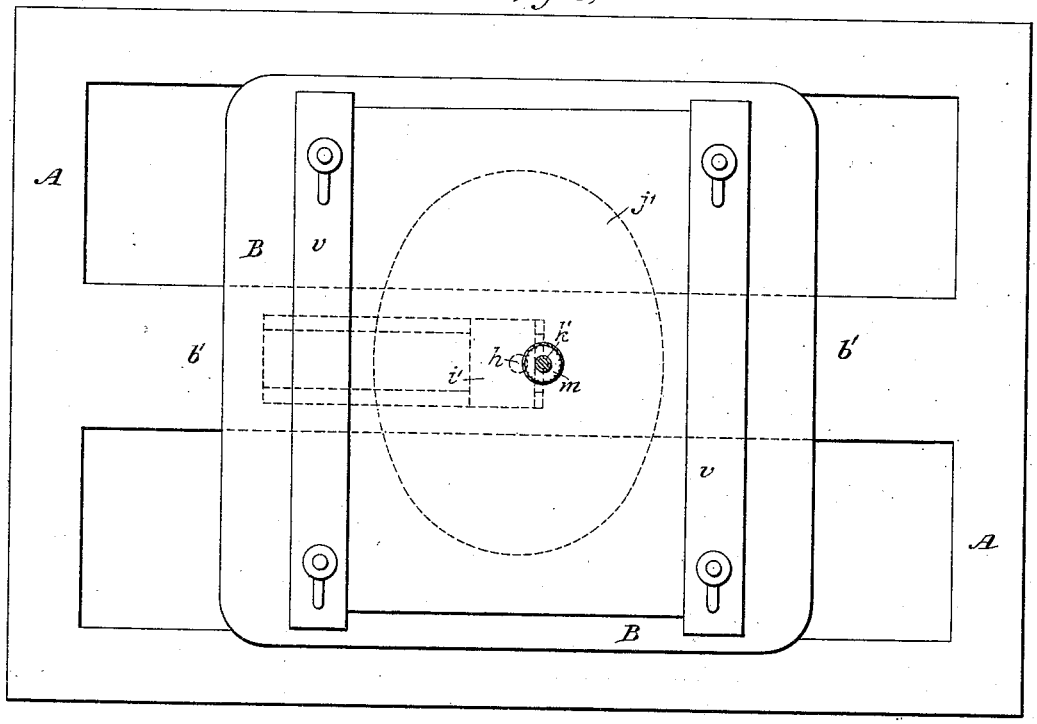
Figure 7:
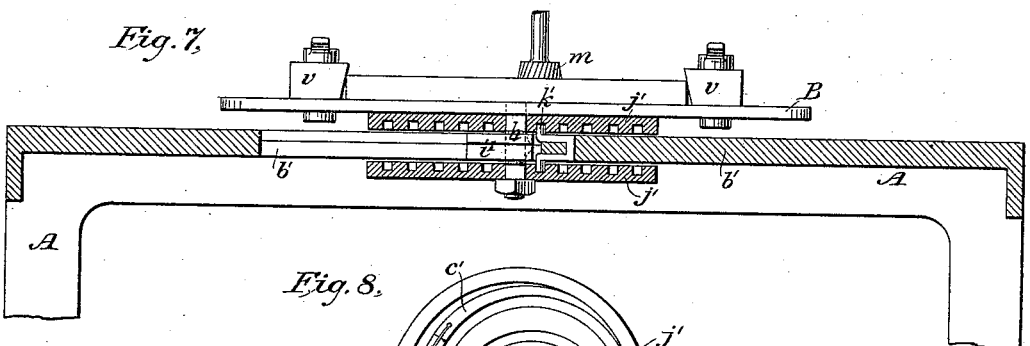
Figure 8:
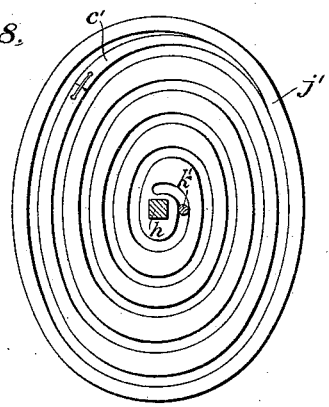

My invention is shown in the accompanying drawings, in which Figure 1 is a front elevation of my machine. Fig. 2 is a plan view of the same. Fig. 3 is a side elevation partly in section. Figs. 4 and 5 are detailed views of my cutting-tools. Figs. 6 and 7 are top plan and sectional views, respectively, of a modified form of my machine; and Fig. 8 is a plan view of the pattern-cam to be used with this modified form of my machine.

Similar letters refer to similar parts in the different figures.

A is the frame of the machine, which can be made of any suitable material, but is preferably made of cast-iron. In the drawings it is shown with four uprights or supports and connecting-rods, and in addition the two strengthening cross-pieces *a a*.

*b b* are two slides moving on the frame-pieces and on the cross-pieces *a a*. These move between pieces *c c*, attached to the frame. The slides *b b* are moved back and forth in their bearings by the wheel *d*, through and by means of the shaft *e*, the cog-wheels *f f*, and the cogged strips *g g*, which are fastened to the slides *b b*, as shown in Fig. 1, and into which the cog-wheels *f f* work.

B is the table, upon which is placed the piece of wood or other material in which the cutting is to be made. This table is fixed permanently to the shaft *h* in any well-known manner, so that it revolves with said shaft. Each of the slides *b b* has in it a long slot, *y*, running lengthwise in the slide and fitted with a track on which the smaller slides *i i* move back and forth in the larger slides. (See Fig. 3.) The shaft *h* is made to move back and forth within the slots in the larger slides by means of the smaller slides *i i*.

*j j* are models or pattern-cams, and are made of the shape that it is desired to give to the cutting or hole that is to be sunk or bored into the piece of wood or other material. These models are exactly like each other in shape and size, and are mounted or keyed on the shaft *h* in any ordinary way, so as to revolve with said shaft. The upper cam is placed immediately underneath the table B, between that table and the upper slide *b*. This cam may be attached by screws or similar means to the table itself, or may be fastened directly to the shaft *h*. The lower model or pattern-cam is placed immediately above the lower slide *b*, and keyed to the shaft *h* at that point.

*k k* are two rollers or revolving wheels that are mounted on the slides *b b* and move with those slides. In place of the rollers *k k* two pins could be used; but I prefer the rollers.

*l* is a weight, which operates constantly to draw the shaft *h* toward the rollers *k k* by means of the intervening pulley and cord shown in Fig. 1.

*m* is the drilling-tool, which is attached to the shaft *n* by means of a set-screw, as shown. The shaft *n* is supported in bearings in position above the table in any ordinary way. In Fig. 3 a supporting frame-work for the drilling-tool is shown adapted to be fastened to the wall back of the machine by screws or similar means. Motion is imparted to the shaft *n* by means of a belt passing over a pulley mounted on said shaft and connecting said shaft with a driving-shaft through the intervention of two additional pulleys, *p*, but one of which is shown, as the other is exactly like it, and in the view given is exactly covered by the one shown. Motion is imparted to the driving-shaft in any usual way. The shaft *n* has a nut screwed on the top of it. The rod *g* passes through the top of this nut, and by means of its enlarged end piece, having a conical form below and a flat surface above, is made to fit neatly into the space between the nut and the top of the shaft *n*, which top has a conical depression in it. (See Fig. 3.) The nut and the shaft *n* revolve around the rod *q*. By lifting or depressing the rod *q* the drilling-tool is raised or lowered. The rod *q* is moved up or down by means of the lever *r*, the rod or cord *s*, the weight *t*, and the treadle *u*. The lever *r* is pivoted on an arm projecting from the frame supporting the drilling-tool. The weight *t* serves to hold the rod *q* and the tool up from the table. By pressing down the treadle the rod *q* and the tool are forced down in position to do the cutting.

The piece of wood or other material from which the cutting is to be made is firmly secured to the table in any well-known way, such as is shown in Figs. 1 and 2. Two clamps, *v v*, are made to move across the surface of the table, and to grip or hold firmly the article interposed between them. This is accomplished by making each clamp ride upon two slides that work in slots running across the table in a direction perpendicular to the clamps. Bolts pass down through the clamps and slides and are provided with shoulders underneath and a tightening-nut above, so that when the clamps have been moved into the proper position they can be fastened in such position by tightening the nuts above. The clamps are made with their inner edges beveled, as shown in Fig. 1.

In the form shown in Figs. 6 and 7, in place of the rollers *k k* and the weight *l*, I substitute the fixed pin *k'*, working in a groove in the cams *j' j'*, as a means of giving the proper motion to the shaft *h*. In this form I do not use the slides *b b*, but have a single fixed cross-piece, *b'*, attached to the frame, in place of the upper slide *b*. There is a slot in this cross-piece *b'*, as before, and a slide, *i'*, moving in the slot. The shaft *h* passes through the slide. The pin *k'* passes through the cross-piece *b'* near the end of the slot, and is then bent at right angles above and below the piece *b'* and sunk below the upper and lower surfaces, respectively, of the piece *b'*, and made to extend into the slot, and then again turned up and down at right angles and made to project beyond the upper and lower surfaces, respectively, of the piece *b'*. The slide *i'* is cut away above and below, so that it can move snugly up against the end of the slot next to the pin *k'* without interfering with the projecting ends of that pin. The two ends of the pin project far enough over the slot to bring the vertical ends very close to the shaft *h* when the slide *i'* is moved to that end of the slot. The shaft *h* projects only a short distance below the lower pattern-cam *j'*. The cams are made, as shown in Fig. 8, with grooves cut into one side of each cam, the grooves being spiral in shape, and leaving thin projecting walls between the successive spirals of the groove. The upper surface of the under cam is grooved in this way, and the grooving exactly corresponds to the grooving of the lower surface of the upper cam. The other features are the same as those already described.

My machine, as shown in Figs. 1 to 5, inclusive, operates in the following manner: The piece of wood or other material in which the cutting is to be made is first secured to the table by the clamps *v v*. Then by moving the slides *b b* the distance of the cutting-tool from the center of the piece of wood or other material is properly adjusted, and thus the size of the cutting to be made is determined relatively to the size of the pattern-cams. The cutting-tool is then depressed by the treadle *u*, rod or cord *s*, lever *r*, and rod *q*, and is brought into contact with the wood. The tool is made with cutting-blades on its under surface as well as on its sides. (See Figs. 4 and 5.) When pressed down, it bores a hole directly into the wood. The depth of the cutting is determined by the distance to which the tool is pressed down. When the proper depth has been reached the tool is no longer depressed, but is held in its position while the table is turned around by the workmen at the proper speed. The table turns easily, the shaft *h*, to which the table is attached, turning in its bearings in the slides *i i*. As the table and the shaft *h* revolve, the two pattern-cams, being attached to the shaft *h*, revolve also. These cams or models as they revolve bear against the rollers *k k*, and are pressed up snugly against those rollers by the operation of the weight *l*. By this means during the revolution of the table the distance of the cutting-tool from the center of the table, or from the center of the cutting in the wood, which must be immediately over the center of the table, is made greater or less in accordance with the shape of the pattern-cams, and thus the shape of the cutting corresponds to the shape of the cam. When one complete revolution of the table has been made, the outside wall of the cutting will have been formed, and a strip of the wood immediately within that wall will have been cut away as wide as the cutting-tool. By again adjusting the slides *b b* the cutting-tool can be brought nearer to the center of the wood to be cut, and another strip can be cut out in a similar manner, and so on until all the wood to be removed has been cut away.

As it is frequently desirable to make a large number of cuttings of exactly the same size, a device is shown at *x* for enabling the workman to adjust the slides *b b* accurately. When the position of the tool has been properly adjusted for the first cutting of all by means of the slides *b b*, the set-piece *x* is placed tightly up against the frame of the machine, as shown in Fig. 1, and by means of a screw working through a slot in the set-piece the latter is securely fastened to the slide *b* in that position. After the first cutting is completed and a new piece of wood or other material is put upon the table, the workman simply moves the slide $b$ so that the set-piece $x$ comes up snugly against the frame, as before, and sees that the table itself is in the same position at the beginning of its revolution as it was before, and the second cutting will be exactly like the first.

By using the form of machine shown in Figs. 6, 7, and 8 the entire cutting can be made without readjusting the position of the table by means of a slide for each layer or ring of cutting. The pattern-cams $j'\ j'$ are so placed on the shaft that the ends of the pin $k'$ project into the innermost ends of the grooves in the two cams, thus causing the cutting to be begun at the center of the piece. The tool is fixed immediately over the projecting ends of the pin. After the tool has been depressed as before the table is turned with the hand, thus turning the shaft $h$ and the cams. As the cams revolve the ends of the pin $k'$ move around in the grooves in the cams, and the shaft $h$ and the table are thus forced gradually away from the pin, and the cutting in the wood or other material on the table is gradually enlarged. The tool is made wider than the pin, wide enough to cut away the portion of the article on the table that is just at the center over the shaft $h$, and also to cut away the parts corresponding to the walls in the cams separating the consecutive circles of the spiral. It is not necessary that the pin $k'$ should fit snugly into the groove in its inner circles, though the more snugly it fits into the groove the better; but it is necessary that the pin should exactly fit into the outermost circle of the groove, in order to make the outline of the cutting in the wood or other material exact and regular. The portion of the wall of the groove marked $c'$ is not rigidly attached to the rest of the cam, but is attached to the adjoining portion of the wall of the groove by a spring-connection, as shown in Fig. 8, so that when the pin $k'$ comes to that part of the outer circle of the groove between the piece $c'$ and the outer rim or wall of the cam the piece $c'$ yields and permits the pin to pass between it and the outer rim, and yet presses against the pin with sufficient force to keep the pin pressed closely against the outer wall.

With this form of machine the cutting is always the same in size as the pattern-cams, unless some slight difference be caused by the use of a larger or smaller tool. The piece $b'$ may be made to slide in bearings, however, just like the slides $b\ b$ in Fig. 1. By this means the size of the cutting in this form of my machine may be increased to any extent desired, though it cannot be made smaller than the cams $j'\ j'$. Cams of any size and shape desired can be placed upon the shaft $h$.

Various modifications and mechanical equivalents can be used without departing from my invention. The lower pattern-cam and roller, instead of being placed on the lower slide $b$, could be placed in a corresponding manner on the under side of the upper slide $b$, and the lower slide could be dispensed with; but I prefer the form shown. In place of the weight $l$ a spring could be used attached to the shaft $h$ and some part of the frame-work; but I prefer the form shown.

What I claim as new, and desire to secure by Letters Patent, is—

1. In a machine for sinking holes or recesses in wood or other materials, in combination with the cutting-tool and table, a table-bearing shaft and pattern cam or cams mounted thereon, said shaft being mounted in bearings capable of a sliding motion toward or from the cutting-tool, and a bearing for the pattern cam or cams, having a fixed position in the machine relatively to the position of the cutting-tool, whereby the movements of the table relatively to the position of the cutting-tool, and therefore the shape of the cutting, is determined by the movements of the pattern-cam relatively to the position of its fixed bearing, substantially as and for the purposes set forth.

2. In a machine for sinking holes or recesses in wood or other materials, in combination with the cutting-tool and table, a table-bearing shaft and pattern cam or cams mounted thereon, said shaft being mounted in bearings capable of a sliding motion toward or from the cutting-tool, and a bearing for the pattern cam or cams, having a fixed position in the machine relatively to the position of the cutting-tool, and suitable means of adjusting the initial position of the tool on the one hand relatively to the position of the table, the shaft, the pattern-cam, and its fixed bearing on the other hand, whereby the movements of the table relatively to the position of the cutting-tool, and therefore the shape of the cutting, is determined by the movement of the pattern-cam relatively to the position of its fixed bearing, and the size of the cutting is adjustable relatively to the size of the pattern-cam, substantially as and for the purposes set forth.

3. In a machine for sinking holes or recesses in wood or other materials, in combination with the cutting-tool and table, a table-bearing shaft and pattern cam or cams mounted thereon, said shaft being mounted in bearings capable of a sliding motion toward or from the cutting-tool, and each pattern-cam having a spiral-like groove or way, and a fixed bearing-pin taking into said groove or way, said bearing-pin having a fixed position in the machine relatively to the position of the cutting-tool, whereby the movements of the table relatively to the position of the cutting-tool, and therefore the shape of the cutting, is determined by the movements of the pattern-cams relatively to the position of its fixed bearing, and the cutting is automatically guided throughout several revolutions of the table, substantially as and for the purposes set forth.

4. In a machine for sinking holes or recesses in wood or other materials, in combination with cutting-tool and table, a table-bearing shaft and pattern cam or cams mounted thereon, said shaft being mounted in bearings capable of a sliding motion toward or from the cutting-tool, and each pattern-cam having a spiral-like groove or way, and a spring portion, c', of the wall forming said groove, and a fixed bearing-pin taking into said groove or way, said bearing-pin having a fixed position in the machine relatively to the position of the cutting-tool, whereby the movements of the table relatively to the position of the cutting-tool, and therefore the shape of the cutting, is determined by the movements of the pattern-cam relatively to the position of its fixed bearing-pin, and the cutting is automatically guided throughout several revolutions of the table, substantially as and for the purposes set forth.

5. In a machine for sinking holes or recesses in wood or other materials, in combination with the cutting-tool and table, a lever-rod, treadle, and weight for lifting and lowering the cutting-tool, a table-bearing shaft, and pattern cam or cams mounted thereon, said shaft being mounted in bearings capable of a sliding motion toward or from the cutting-tool, and a bearing for the pattern cam or cams, having a fixed position in the machine relatively to the position of the cutting-tool, whereby the movements of the table relatively to the position of the cutting-tool, and therefore the shape of the cutting, is determined by the movements of the pattern-cams relatively to the position of its fixed bearing, substantially as and for the purposes set forth.

6. In a machine for cutting holes or recesses in wood or other materials, the combination of the frame A, cross-pieces a, table B, slides b b, wheel d, shaft e, cog-wheels f f, cogged strips g g, shaft h, slides i i, pattern-cams j j, rollers k k, weight l, tool m, tool-shaft n, arm q, lever r, rod s, weight t, treadle u, and clamps v v, substantially as and for the purposes set forth.

HERRMANN WEICHERT.

Witnesses:
ROBERT N. KENYON,
EDWIN SEGER.